United States Patent
Fecant et al.

(10) Patent No.: US 12,312,544 B2
(45) Date of Patent: May 27, 2025

(54) HYDRODESULFURIZATION CATALYST WITH ACTIVE-PHASE DISTRIBUTION AS A CRUST

(71) Applicant: IFP Energies nouvelles, Rueil-Malmaison (FR)

(72) Inventors: Antoine Fecant, Rueil-Malmaison (FR); Charlie Blons, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 197 days.

(21) Appl. No.: 17/854,510

(22) Filed: Jun. 30, 2022

(65) Prior Publication Data

US 2023/0044005 A1    Feb. 9, 2023

(30) Foreign Application Priority Data

Jul. 22, 2021   (FR) .................... 21/07.959

(51) Int. Cl.
| | |
|---|---|
| *C10G 45/08* | (2006.01) |
| *B01J 27/185* | (2006.01) |
| *B01J 27/19* | (2006.01) |
| *B01J 35/51* | (2024.01) |
| *B01J 35/61* | (2024.01) |
| *B01J 35/63* | (2024.01) |

(52) U.S. Cl.
CPC .......... *C10G 45/08* (2013.01); *B01J 27/1853* (2013.01); *B01J 27/19* (2013.01); *B01J 35/51* (2024.01); *B01J 35/615* (2024.01); *B01J 35/633* (2024.01); *B01J 35/635* (2024.01); *C10G 2300/1037* (2013.01); *C10G 2300/202* (2013.01); *C10G 2400/02* (2013.01)

(58) Field of Classification Search
CPC ...... B01J 21/04; B01J 23/882; B01J 27/1853; B01J 27/19; B01J 35/30; B01J 35/393; B01J 35/397; B01J 35/51; B01J 35/615; B01J 35/633; B01J 35/635; B01J 37/0018; B01J 37/0201; B01J 37/0205; B01J 37/0207; B01J 37/0213; B01J 37/088; B01J 37/16; B01J 37/20; B01J 37/28; C10G 45/08; C10G 2300/1037; C10G 2300/1044; C10G 2300/202; C10G 2400/02

See application file for complete search history.

(56) References Cited

U.S. PATENT DOCUMENTS

| | | |
|---|---|---|
| 2016/0001272 A1 | 1/2016 | Daudin et al. |
| 2022/0062874 A1 | 3/2022 | Devers |

FOREIGN PATENT DOCUMENTS

| | | |
|---|---|---|
| WO | 2020126680 A1 | 6/2020 |

OTHER PUBLICATIONS

Search Report for Corresponding French Patent Application No. 21/07.959 dated Apr. 6, 2022.

*Primary Examiner* — Brian A McCaig
(74) *Attorney, Agent, or Firm* — Csaba Henter; MILLEN, WHITE, ZELANO & BRANIGAN

(57) ABSTRACT

Catalyst containing an active phase which contains a group VIB element, at least one group VIII element and phosphorus, and a support containing alumina, the catalyst being characterized in that at least 80% by weight of the group VIB elements, of the group VIII elements and of the phosphorus are distributed in the form of a crust at the periphery of said support, the thickness of said crust being between 100 and 1200 μm, the content of group VIB element being between 1% and 8% by weight relative to the total weight of the catalyst, the content of group VIII element being between 0.5% and 5% by weight relative to the total weight of the catalyst, and the content of phosphorus being between 0.2% and 3% by weight relative to the total weight of the catalyst, and the support having a specific surface area of between 100 m$^2$/g and 250 m$^2$/g.

9 Claims, No Drawings

HYDRODESULFURIZATION CATALYST WITH ACTIVE-PHASE DISTRIBUTION AS A CRUST

FIELD OF THE INVENTION

The present invention relates to the field of hydrotreating gasoline cuts, notably gasoline cuts resulting from fluidized-bed catalytic cracking units. More particularly, the present invention relates to a catalyst and to the use thereof in a process for hydrodesulfurization of an olefinic gasoline cut containing sulfur, such as the gasolines resulting from catalytic cracking, for which it is sought to reduce the content of sulfur-bearing compounds, without hydrogenating the olefins and the aromatics.

PRIOR ART

Petroleum refining and also petrochemistry are now subject to new constraints. This is because all countries are gradually adopting strict sulfur specifications, the objective being to achieve, for example, 10 ppm (by weight) of sulfur in petroleums sold in Europe and in Japan. The problem of reducing sulfur contents is essentially focused on gasolines obtained by cracking, whether catalytic (FCC, Fluid Catalytic Cracking) or noncatalytic (coking, visbreaking, steam cracking), the main precursors of sulfur in gasoline pools.

One solution, well known to those skilled in the art, for reducing the sulfur content consists in carrying out a hydrotreating (or hydrodesulfurization) of the hydrocarbon cuts (and notably of catalytic cracking gasolines) in the presence of hydrogen and of a heterogeneous catalyst. However, this process exhibits the major disadvantage of causing a very significant drop in the octane number if the catalyst employed is not sufficiently selective. This reduction in the octane number is linked notably to the hydrogenation of the olefins present in this type of gasoline concomitantly with the hydrodesulfurization. Unlike other hydrotreating processes, the hydrodesulfurization of gasolines thus has to make it possible to respond to a double antagonistic constraint: to provide extreme hydrodesulfurization of gasolines and to limit the hydrogenation of the unsaturated compounds present.

One way for confronting this double problem consists in employing hydrodesulfurization catalysts which are both active in terms of hydrodesulfurization and also very selective for hydrodesulfurization relative to the hydrogenation reaction of olefins.

In relation to this, B. Liu et al. (Fuel, Volume: 25, 2012, pages 457-463, JOURNAL OF NATURAL GAS CHEMISTRY, Volume: 21 Issue: Mar. 2, 2012, pages: 194-199) have demonstrated the improvement in performance levels for hydrodesulfurization of gasoline resulting from a catalytic cracking step using CoMoS-on-gamma-alumina catalysts when the CoMoS phase is distributed as a crust within the catalyst.

Moreover, document CN104275191 discloses a selective hydrogenation catalyst for an FCC gasoline, comprising nickel and molybdenum deposited on an alumina support, the nickel and molybdenum being distributed in the form of a crust at the periphery of the support.

Document US 2018/0193823 discloses a hydropyrolysis process using a catalyst based on nickel, cobalt and molybdenum, which are distributed in the form of a crust at the periphery of the support.

Finally, document US 2011/275856 discloses a catalyst composed of an active phase based on Mo, V, W, Cu, said active phase being located at the periphery of the support. This catalyst can be advantageously used for converting acrolein into acrylic acid.

In this context, one of the objectives of the present invention is to provide a catalyst and the use thereof in a process for the hydrodesulfurization of an olefinic gasoline cut containing sulfur, exhibiting activity and selectivity performance levels that are at least as good, even better, than the catalysts known from the prior art.

Subjects of the Invention

The present invention relates to a catalyst comprising an active phase containing at least one group VIB element, at least one group VIII element and phosphorus, and a porous support containing at least alumina, said catalyst being characterized in that at least 80% by weight of the group VIB elements, of the group VIII elements and of the phosphorus are distributed in the form of a crust at the periphery of said support, the thickness of said crust being between 100 and 1200 μm, the content of group VIB element, measured in oxide form, being between 1% and 8% by weight relative to the total weight of the catalyst, the content of group VIII element, measured in oxide form, being between 0.5% and 5% by weight relative to the total weight of the catalyst, and the content of phosphorus, measured in its oxide form $P_2O_5$, being between 0.2% and 3% by weight relative to the total weight of the catalyst, said support comprising a specific surface area of between 100 $m^2/g$ and 250 $m^2/g$.

The applicant has discovered, surprisingly, that a catalyst based on at least one group VIII element, at least one group VIB element and phosphorus distributed specifically in a support comprising a particular specific surface area exhibits better hydrodesulfurization activity and better hydrodesulfurization selectivity compared to the catalysts disclosed in the prior art. Without wishing to be bound by any theory, it is envisaged that the hydrotreatment of the sulfur-bearing compounds is limited by the diffusion of the reagents within the support; thus, the active phase present mainly at the periphery of the support allows improved activity and selectivity in selective hydrogenation. This is because the combination of phosphorus with the group VIII elements and group VIB elements enables a control of the interactions between the active phase and the alumina-based support having a high specific surface area promoting localization, of said active phase, as a crust while at the same time maintaining a high dispersion which thus maximizes the number of active sites and promotes conversion of the sulfur-bearing compounds. The optimization of the active phase on a specific support makes it possible to use catalysts which are less charged with active phase, while at the same time exhibiting performance levels in terms of activity and/or selectivity which are as good, or even better, than those obtained with the prior art catalysts.

According to one or more embodiments, the molar ratio of the group VIII element to the group VIB element is between 0.1 and 2.0 mol/mol.

According to one or more embodiments, the molar ratio of the phosphorus to the group VIB metal is between 0.1 and 2.0 mol/mol.

According to one or more embodiments, said specific surface area of the support is between 120 and 220 $m^2/g$.

According to one or more embodiments, the thickness of said crust is between 200 and 1000 μm.

According to one or more embodiments, the content of group VIB element, measured in oxide form, is between 2% and 7% by weight relative to the total weight of the catalyst.

According to one or more embodiments, the content of group VIII element, measured in oxide form, is between 0.5% and 4% by weight relative to the total weight of the catalyst.

According to one or more embodiments, the content of phosphorus, measured in its oxide form $P_2O_5$, is between 0.2% and 2% by weight, relative to the total weight of the catalyst.

According to one or more embodiments, said support is based on gamma-alumina and/or chi-alumina, taken alone or as a mixture.

According to one or more embodiments, said support is in the form of beads.

According to one or more embodiments, the molar ratio of the group VIII element to the group VIB element is between 0.35 and 0.45 mol/mol.

According to one or more embodiments, the molar ratio of the phosphorus to the group VI metal is between 0.2 and 0.4 mol/mol.

According to one or more embodiments, said specific surface area of the support is between 130 $m^2/g$ and 198 $m^2/g$.

According to one or more embodiments, said support has a total pore volume, measured by mercury porosimetry, of between 0.3 and 0.9 $cm^3/g$.

Another subject according to the invention relates to a process for the hydrodesulfurization of a sulfur-containing olefinic gasoline cut, in which said gasoline cut, hydrogen and said catalyst according to the invention are brought into contact, said hydrodesulfurization process being carried out at a temperature of between 200° C. and 400° C., a total pressure of between 1 MPa and 3 MPa, an hourly space velocity, defined as being the flow rate by volume of feedstock relative to the volume of the catalyst, of between 1 $h^{-1}$ and 10 $h^{-1}$ and a hydrogen/gasoline cut ratio by volume of between 100 and 600 Sl/l.

DETAILED DESCRIPTION OF THE INVENTION

Definitions

In the text hereinbelow, the groups of chemical elements are given according to the CAS classification (CRC Handbook of Chemistry and Physics, published by CRC Press, editor-in-chief D. R. Lide, $81^{st}$ edition, 2000-2001). For example, group VIII according to the CAS classification corresponds to the metals of columns 8, 9 and 10 according to the new IUPAC classification.

The term "specific surface area" is understood to mean the BET specific surface area ($S_{BET}$ in $m^2/g$) determined by nitrogen adsorption in accordance with Standard ASTM D 3663-78 established from the Brunauer-Emmett-Teller method described in the journal "The Journal of the American Chemical Society", 1938, 60, 309.

Total pore volume of the catalyst or of the support used for the preparation of the catalyst is understood to mean the volume measured by mercury porosimetry intrusion according to Standard ASTM D4284 at a maximum pressure of 4000 bar (400 MPa), using a surface tension of 484 dynes/cm and a contact angle of 140°, for example with a Micromeritics® instrument, model Autopore III.

The wetting angle was taken equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur. In order to obtain better accuracy, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (approximately 0.2 MPa).

The contents of group VIII elements, group VIB elements and phosphorus are measured by X-ray fluorescence.

Definition of the Coefficient of Distribution R

The distribution profiles of the elements within the catalyst grains are obtained using a Castaing microprobe. At least 30 points of analysis are performed along the diameter of the bead or of the extrudate at a proportion of about 10 or so points on the crust of an active element (in this case the group VIB and group VIII elements and the phosphorus) and about 10 or so points at the centre of the grain. The distribution profile c(x) for x∈[−r; +r] thus obtained with c the local weight concentration of the element, r the radius of the bead or of the extrudate, and x the position of the point of analysis along the diameter of the grain relative to the centre of this grain.

The distribution of the elements is characterized by an a dimensional coefficient of distribution R weighting the local concentration by an increasing weight as a function of the position on the diameter. By definition:

$$R = \frac{r^2}{3}\int_{-r}^{r} c(x)dx \bigg/ \int_{-r}^{r} c(x)x^2 dx$$

Thus an element of which the concentration is uniform has a coefficient of distribution R equal to 1, an element deposited as a dome (concentration at the core greater than the concentration at the edges of the support) has a coefficient greater than 1, and an element distributed as a crust (concentration at the edges greater than the concentration at the core of the support) has a coefficient of less than 1. The analysis using a Castaing microprobe gives the values of the concentrations in a finite number of values of x, R is thus evaluated numerically by integration methods well known to those skilled in the art. Preferably, R is determined by the trapezium method.

Definition of the Crust Thickness of the Group VIB and Group VIII Elements and the Phosphorus In order to analyze the distribution of the active phase of group VIB elements, of group VIII elements and of phosphorus within the support, a crust thickness is measured using a Castaing microprobe (or electron microprobe microanalysis). The device used is a CAMECA® XS100, equipped with four monochromator crystals allowing the simultaneous analysis of four elements. The Castaing microprobe analysis technique consists of the detection of X-rays emitted by a solid after excitation of its elements by a high-energy electron beam. For the purposes of this characterization, the catalyst grains are coated in blocks of epoxy resin. These blocks are polished until the cross section through the diameter of the beads or extrudates is reached, and then metallized by depositing carbon in a metal evaporator. The electron probe is scanned along the diameter of five beads or extrudates to obtain the mean distribution profile of the constituent elements of the solids.

When the element analyzed is distributed as a crust, its local concentration generally gradually decreases when it is measured starting from the edge of the catalytic grain to the inside. In order to measure a crust thickness which is significant for the majority of the particles of group VIB elements, of group VIII elements and of phosphorus, the crust thickness is defined as the distance to the edge of the grain containing 80% by weight of all the group VIB and group VIII elements and phosphorus.

It is defined in the publication by L. Sorbier et al. "*Measurement of palladium crust thickness on catalyst by EPMA*", Materials Science and Engineering 32 (2012). In order to measure a crust thickness which is significant for the majority of the particles, the crust thickness can alternatively be defined as the distance to the edge of the grain containing 80% by weight of all the group VIB elements, group VIII elements and phosphorus. From the distribution profile obtained using the Castaing microprobe (c(x)), it is possible to calculate the cumulative amount Q(y) of each element in the grain as a function of the distance y to the edge of the grain of radius r.

For a bead:

$$Q(y)=\int_{-r}^{-y}c(x)4\pi \cdot x^2 dx + \int_{y}^{r}c(x)4\pi \cdot x^2 dx$$

For an extrudate:

$$Q(y)=\int_{-r}^{-r+y}c(x)2\pi \cdot x dx + \int_{r-y}^{r}c(x)2\pi \cdot x dx$$

with
r: radius of the grain;
y: distance to the edge of the grain;
x: integration variable (position on the profile).

It is assumed that the concentration profile follows the diameter taken from x=−r to x=+r (x=0 being the centre). Q(r) thus corresponds to the total amount of the element in the grain. The following equation is then numerically resolved in y:

$$\frac{Q(y)}{Q(r)}=0.8$$

c being a strictly positive function, Q is therefore a strictly increasing function and this equation has a single solution which is the crust thickness.

Catalyst

The catalyst according to invention comprises, preferably consists of, an active phase containing at least one group VIB element, at least one group VIII element and phosphorus, and a porous support containing at least alumina, said catalyst being characterized in that at least 80% by weight of the group VIB elements, of the group VIII elements and of the phosphorus are distributed in the form of a crust at the periphery of said support, the thickness of said crust being between 100 and 1200 μm, the content of group VIB element, measured in oxide form, being between 1% and 8% by weight relative to the total weight of the catalyst, the content of group VIII element, measured in oxide form, being between 0.5% and 5% by weight relative to the total weight of the catalyst, and the content of phosphorus, measured in its oxide form $P_2O_5$, being between 0.2% and 3% by weight relative to the total weight of the catalyst, said support comprising a specific surface area of between 100 $m^2/g$ and 250 $m^2/g$.

Advantageously, said group VIB and group VIII elements and phosphorus are distributed at the periphery of the porous support with a coefficient of distribution R, measured using a Castaing microprobe, of less than 0.8, preferably less than 0.7.

Advantageously, at least 80% by weight of the group VIB and VIII elements and of the phosphorus is distributed in a crust at the periphery of said support, the thickness of said crust being between 100 and 1200 μm, preferably between 200 and 1000 μm.

The content of group VIB element of the active phase, measured in oxide form, is between 1% and 8% by weight relative to the total weight of the catalyst, preferably between 2% and 7% by weight, and even more preferentially between 3% and 6% by weight. The group VIB element is preferably chosen from molybdenum and tungsten. More preferably, the group VIB element is molybdenum. When the element is molybdenum or tungsten, the metal content is expressed as $MoO_3$ or $WO_3$, respectively.

The content of group VIII element of the active phase, measured in oxide form, is between 0.5% and 5% by weight relative to the total weight of the catalyst, preferably between 0.5% and 4% by weight, and even more preferentially between 0.5% and 3% by weight. The group VIII element is preferably chosen from nickel, cobalt and iron. More preferably, the group VIII element is cobalt. When the element is cobalt or nickel, the element content is expressed as CoO or NiO, respectively.

The content of phosphorus, measured in its oxide form $P_2O_5$, is between 0.2% and 3% by weight relative to the total weight of the catalyst, preferably between 0.2% and 2% by weight, and even more preferentially between 0.3% and 1.5% by weight.

The contents of group VIB element, of group VIII element and of phosphorus in the catalyst are expressed as oxides after correction for the loss on ignition of the catalyst sample at 550° C. in a muffle furnace for two hours. The loss on ignition is due to the loss of moisture. It is determined according to ASTM D7348.

Preferably, the molar ratio of said group VIII element of the active phase to said group VIB element of the active phase is between 0.1 and 2.0 mol/mol, preferably between 0.3 and 1.0 mol/mol, more preferentially between 0.3 and 0.5 mol/mol, and even more preferably between 0.35 and 0.45 mol/mol.

Preferably, the molar ratio of the phosphorus to the group VIB element of the active phase is between 0.1 and 2.0 mol/mol, preferably between 0.2 and 1.0 mol/mol, more preferentially between 0.2 and 0.7 mol/mol, even more preferably between 0.2 and 0.5 mol/mol, and even more preferably between 0.2 and 0.4 mol/mol.

The specific surface area of the catalyst is between 100 $m^2/g$ and 250 $m^2/g$, preferably between 120 $m^2/g$ and 220 $m^2/g$, more preferentially between 120 $m^2/g$ and 200 $m^2/g$, and even more preferentially between 130 $m^2/g$ and 198 $m^2/g$.

The catalyst advantageously has a total pore volume, measured by mercury porosimetry, of between 0.3 $cm^3/g$ and 0.9 $cm^3/g$, preferably between 0.35 $cm^3/g$ and 0.8 $cm^3/g$, and very preferably between 0.4 $cm^3/g$ and 0.7 $cm^3/g$.

Support

The support of the catalyst according to the invention can be in the form of beads, of extrudates of any geometry, of platelets, of pellets, of a compressed cylinder, other crushed solid or any other shaping. Preferably, the support is in the form of beads with a diameter of 0.5 to 6 mm or in the form of cylindrical, trilobe or quadrilobe extrudates with a circumscribed diameter of 0.8 to 3 mm. More preferentially, the support is in the form of beads.

The support of said catalyst according to the invention comprises alumina, preferably chosen from the following aluminas: gamma-, delta-, theta-, eta-, rho-, chi-, kappaaluminas, taken alone or as a mixture. Preferably, the support is based on gamma-alumina and/or chi-alumina, taken alone or as a mixture.

The specific surface area of the support is between 100 m$^2$/g and 250 m$^2$/g, preferably between 120 m$^2$/g and 220 m$^2$/g, more preferentially between 120 m$^2$/g and 200 m$^2$/g, and even more preferentially between 130 m$^2$/g and 198 m$^2$/g.

The support advantageously has a total pore volume, measured by mercury porosimetry, of between 0.3 cm$^3$/g and 0.9 cm$^3$/g, preferably between 0.35 cm$^3$/g and 0.8 cm$^3$/g, and very preferably between 0.4 cm$^3$/g and 0.7 cm$^3$/g.

Preparation of the Catalyst

The catalyst according to the invention can be prepared by means of any technique known to those skilled in the art, and notably by impregnation of the group VIII and VIB elements and phosphorus on the selected porous support. The impregnation can, for example, be carried out according to the method known to those skilled in the art under the terminology of dry impregnation, in which just the amount of precursors of desired elements in the form of salts soluble in the chosen solvent, for example demineralized water, is introduced so as to fill as exactly as possible the porosity of the support. Preferably, the aqueous impregnation solution, when it contains cobalt, molybdenum and phosphorus, is prepared under pH conditions which promote the formation of heteropolyanions in solution. For example, the pH of such an aqueous solution is between 1 and 5. Preferably, the preparation of the catalyst is carried out without the addition of an organic agent as a mixture with the precursors of the group VIII and group VI elements and phosphorus.

Use may be made, by way of example, among the sources of molybdenum, of the oxides and hydroxides, molybdic acids and salts thereof, in particular the ammonium salts, such as ammonium molybdate, ammonium heptamolybdate, phosphomolybdic acid ($H_3PMo_{12}O_{40}$), and salts thereof, and optionally silicomolybdic acid ($H_4SiMo_{12}O_{40}$) and salts thereof. The sources of molybdenum can also be any heteropolycompound of Keggin, lacunary Keggin, substituted Keggin, Dawson, Anderson or Strandberg type, for example. Use is preferably made of molybdenum trioxide and the heteropolycompounds of Keggin, lacunary Keggin, substituted Keggin and Strandberg type.

The tungsten precursors which can be used are also well known to those skilled in the art. For example, use may be made, among the sources of tungsten, of the oxides and hydroxides, tungstic acids and salts thereof, in particular the ammonium salts such as ammonium tungstate or ammonium metatungstate, phosphotungstic acid and salts thereof, and optionally silicotungstic acid ($H_4SiW_{12}O_{40}$) and salts thereof. The sources of tungsten can also be any heteropolycompound of Keggin, lacunary Keggin, substituted Keggin or Dawson type, for example. Use is preferably made of the oxides and the ammonium salts, such as ammonium metatungstate, or the heteropolyanions of Keggin, lacunary Keggin or substituted Keggin type.

The cobalt precursors which can be used are advantageously chosen from the oxides, hydroxides, hydroxycarbonates, carbonates and nitrates, for example. Use is preferably made of cobalt hydroxide and cobalt carbonate.

The nickel precursors which can be used are advantageously chosen from the oxides, hydroxides, hydroxycarbonates, carbonates and nitrates, for example. Use is preferably made of nickel hydroxide and nickel hydroxycarbonate.

The phosphorus can advantageously be introduced alone or as a mixture with at least one of the group VIB and VIII elements. The phosphorus is preferably introduced as a mixture with the precursors of the group VIB and group VIII metals by dry impregnation of said porous support using a solution containing the precursors of the elements and the phosphorus precursor. The preferred source of phosphorus is orthophosphoric acid $H_3PO_4$, but the salts and esters thereof, such as ammonium phosphates or mixtures thereof, are also suitable for use. The phosphorus can also be introduced at the same time as the group VIB element(s) in the form, for example, of Keggin, lacunary Keggin, substituted Keggin or Strandberg-type heteropolyanions.

The support thus filled with the solution can be left to mature at a temperature of less than 50° C., preferably at ambient temperature, for a time not exceeding 12 hours, preferably not exceeding 6 hours.

Following the maturation step, the catalyst precursor obtained can undergo a heat treatment. The aim of this treatment is generally to transform the molecular precursors of the elements into the oxide phase. It is in this case an oxidizing treatment but a simple drying of the catalyst can also be carried out.

In the case of drying, the catalyst precursor is dried at a temperature of between 50° C. and 200° C., preferably between 70° C. and 180° C., for a period typically of between 0.5 hour and 12 hours, and even more preferably for a period of between 0.5 hour and 5 hours.

In the case of an oxidizing treatment, also referred to as calcination, said treatment is generally carried out under air or under dilute oxygen, and the treatment temperature is generally between 200° C. and 550° C., preferably between 300° C. and 500° C., and advantageously for a period typically of between 0.5 hour and 24 hours, preferably for a period from 0.5 hour to 12 hours, and even more preferably for a period from 0.5 hour to 10 hours.

Before it is used as a hydrotreatment catalyst, it is advantageous to subject the optionally dried or calcined catalyst to a step of activation by sulfurization. This activation phase is carried out by methods well known to those skilled in the art, and advantageously under a sulfo-reductive atmosphere in the presence of hydrogen and hydrogen sulfide. The hydrogen sulfide can be used directly or generated by a sulfide agent (such as dimethyl disulfide).

Process for Hydrodesulfurization of Gasoline

The hydrotreatment process consists in bringing the sulfur-containing olefinic gasoline cut into contact with a catalyst as described above and hydrogen under the following conditions:
- a temperature of between 200° C. and 400° C., preferably of between 230° C. and 330° C.;
- at a total pressure of between 1 MPa and 3 MPa, preferably of between 1.5 MPa and 2.5 MPa;
- an hourly space velocity (HSV), defined as being the flow rate by volume of feedstock relative to the volume of catalyst, of between 1 h$^{-1}$ and 10 h$^{-1}$, preferably of between 2 h$^{-1}$ and 6 h$^{-1}$,
- a hydrogen/gasoline feedstock ratio by volume of between 100 and 600 Sl/l, preferably of between 200 and 400 Sl/l.

Thus, the process according to the invention makes it possible to treat any type of sulfur-containing olefinic gasoline cut, such as, for example, a cut resulting from a coking, visbreaking, steam cracking or catalytic cracking (FCC, Fluid Catalytic Cracking) unit. This gasoline can optionally be composed of a significant fraction of gasoline originating from other production processes, such as atmospheric distillation (gasoline resulting from a direct distillation (or straight run gasoline)), or from conversion processes (coking or steam cracked gasoline). Said feedstock preferably consists of a gasoline cut resulting from a catalytic cracking unit.

The feedstock is advantageously a gasoline cut containing sulfur-containing compounds and olefins and has a boiling point of between 30° C. and less than 250° C., preferably between 35° C. and 240° C., and preferably between 40° C. and 220° C.

The sulfur content of the gasoline cuts produced by catalytic cracking (FCC) depends on the sulfur content of the feedstock treated by the FCC, on the presence or not of a pretreatment of the feedstock of the FCC, and also on the end point of the cut. Generally, the sulfur contents of the whole of a gasoline cut, notably those originating from the FCC, are greater than 100 ppm by weight and most of the time greater than 500 ppm by weight. For gasolines having end points of greater than 200° C., the sulfur contents are often greater than 1000 ppm by weight; they can even, in certain cases, reach values of the order of 4000 to 5000 ppm by weight.

In addition, the gasolines resulting from catalytic cracking (FCC) units contain, on average, between 0.5% and 5% by weight of diolefins, between 20% and 50% by weight of olefins and between 10 ppm and 0.5% by weight of sulfur, generally less than 300 ppm of which of mercaptans. The mercaptans are generally concentrated in the light fractions of the gasoline and more specifically in the fraction, the boiling point of which is less than 120° C.

It should be noted that the sulfur compounds present in the gasoline can also comprise heterocyclic sulfur compounds, such as, for example, thiophenes, alkylthiophenes or benzothiophenes. These heterocyclic compounds, unlike mercaptans, cannot be removed by extractive processes. These sulfur compounds are consequently removed by a hydrotreating, which leads to their transformation into hydrocarbons and $H_2S$.

Preferably, the gasoline treated by the process according to the invention is a heavy gasoline (or HCN for Heavy Cracked Naphtha) resulting from a distillation step aimed at separating a broad cut of the gasoline resulting from a cracking process (or FRCN for Full Range Cracked Naphtha) into a light gasoline (LCN for Light Cracked Naphtha) and a heavy gasoline HCN. The cut point of the light gasoline and of the heavy gasoline is determined in order to limit the sulfur content of the light gasoline and to make it possible to use it in the gasoline pool, preferably without additional post-treatment. Advantageously, the broad cut FRCN is subjected to a selective hydrogenation step described below before the distillation step.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 21/07.959, filed Jul. 22, 2021, are incorporated by reference herein.

EXAMPLES

The invention is subsequently described through the following examples without limiting the scope thereof.

Example 1: Preparation of Catalyst a (in Accordance with the Invention)

A support A' is provided, which support is mainly composed of gamma-alumina in the form of beads with a particle size of between 2 and 4 mm, and having a specific surface area of 194 m$^2$/g and a pore volume of 0.60 ml/g.

Cobalt, molybdenum and phosphorus are then added. The impregnation solution is prepared by dissolution, at 100° C., of molybdenum oxide (1.14 g, ≥99.5%, Sigma-Aldrich®), of cobalt hydroxide (0.3 g, 96%, Alfa Aesar®), of phosphoric acid at 85% by weight (0.24 g, 99.99%, Sigma-Aldrich®) in 16 ml of demineralized water. After dry impregnation of 20 g of support A', the impregnated alumina is left to mature in a water-saturated atmosphere at ambient temperature for 4 hours, and then dried at 120° C. for 4 hours. The catalyst thus obtained is denoted A.

The final metal composition of the catalyst A, expressed in the form of oxides and relative to the weight of dry catalyst, is then the following: $MoO_3$=5.3+/−0.2% by weight, CoO=1.1+/−0.1% by weight and $P_2O_5$=0.7+/−0.1% by weight. The Co/Mo and P/Mo molar ratios are respectively 0.39 and 0.27. The pore volume of the catalyst A is 0.55 ml/g and the specific surface area is 189 m$^2$/g.

The distributions of the elements and thicknesses of the crust in the active phase of the catalyst A, measured using a Castaing microprobe, are given in Table 1.

Example 2: Preparation of Catalyst B (in Accordance with the Invention)

A support B' is provided, which support is mainly composed of gamma-alumina in the form of beads with a particle size of between 2 and 4 mm, and having a specific surface area of 145 m$^2$/g and a pore volume of 0.63 ml/g.

Cobalt, molybdenum and phosphorus are then added. The impregnation solution is prepared by dissolution, at 100° C., of molybdenum oxide (1.12 g, 99.5%, Sigma-Aldrich®), of cobalt hydroxide (0.3 g, 96%, Alfa Aesar®), of phosphoric acid at 85% by weight (0.24 g, 99.99%, Sigma-Aldrich®) in 14.7 ml of demineralized water. After dry impregnation of 20 g of support B', the impregnated alumina is left to mature in a water-saturated atmosphere at ambient temperature for 4 hours, and then dried at 120° C. for 4 hours. The catalyst thus obtained is denoted B.

The final metal composition of the catalyst B, expressed in the form of oxides and relative to the weight of dry catalyst, is then the following: $MoO_3$=5.2+/−0.2% by weight, CoO=1.1+/−0.1% by weight and $P_2O_5$=0.7+/−0.1% by weight. The Co/Mo and P/Mo molar ratios are respectively 0.38 and 0.26. The pore volume of the catalyst B is 0.57 ml/g and the specific surface area is 141 m$^2$/g.

The distributions of the elements and thicknesses of the crust in the active phase of the catalyst B, measured using a Castaing microprobe, are given in Table 1.

Example 3: Preparation of Catalyst C (not in Accordance with the Invention; Low $S_{BET}$)

A support C' is provided, which support is mainly composed of theta- and delta-alumina in the form of beads with a particle size of between 2 and 4 mm, and having a specific surface area of 81 m²/g and a pore volume of 1.03 ml/g.

Cobalt, molybdenum and phosphorus are then added. The impregnation solution is prepared by dissolution, at 100° C., of molybdenum oxide (0.63 g, 99.5%, Sigma-Aldrich®), of cobalt hydroxide (0.16 g, 96%, Alfa Aesar®), of phosphoric acid at 85% by weight (0.14 g, 99.99%, Sigma-Aldrich®) in 14.8 ml of demineralized water. After dry impregnation of 20 g of support C', the impregnated alumina is left to mature in a water-saturated atmosphere at ambient temperature for 4 hours, and then dried at 120° C. for 4 hours. The catalyst thus obtained is denoted C.

The final metal composition of the catalyst C, expressed in the form of oxides and relative to the weight of dry catalyst, is then the following: $MoO_3$=3.0+/−0.2% by weight, CoO=0.6+/−0.1% by weight and $P_2O_5$=0.4+/−0.1% by weight. The Co/Mo and P/Mo molar ratios are respectively 0.38 and 0.27. The pore volume of the catalyst C is 1.02 ml/g and the specific surface area is 80 m²/g.

The distributions of the elements and thicknesses of the crust in the active phase of the catalyst C, measured using a Castaing microprobe, are given in Table 1.

Example 4: Preparation of Catalyst D (not in Accordance with the Invention, No Phosphorus)

A support D' is provided, which support is identical to the support A' of Example 1.

Cobalt and molybdenum are then added. The impregnation solution is prepared by dissolution, at 90° C., of ammonium heptamolybdate tetrahydrate (1.39 g, 99.98%, Sigma-Aldrich®), and of cobalt nitrate hexahydrate (0.89 g, 98%, Sigma-Aldrich®) in 16 ml of water. After dry impregnation of 20 g of support D', the impregnated alumina is left to mature in a water-saturated atmosphere at ambient temperature for 4 h, and then dried at 120° C. for 4 hours. The solid is then calcined under air at 450° C. for 2 hours. The catalyst thus obtained is denoted D.

The final metal composition of the catalyst D, expressed in the form of oxides and relative to the weight of dry catalyst, is then the following: $MoO_3$=5.3+/−0.2% by weight and CoO=1.1+/−0.1% by weight. The Co/Mo molar ratio is 0.39. The pore volume of the catalyst D is 0.58 ml/g and the specific surface area is 182 m²/g.

The distributions of the elements and thicknesses of the crust in the active phase of the catalyst D, measured using a Castaing microprobe, are given in Table 1.

Example 5: Preparation of Catalyst E (not in Accordance with the Invention, High Mo Content)

A support E' is provided, which support is identical to the support B' of Example 2.

Cobalt, molybdenum and phosphorus are then added. The impregnation solution is prepared by dissolution, at 90° C., of molybdenum oxide (2.45 g, 99.5%, Sigma-Aldrich®), of cobalt hydroxide (0.60 g, 96%, Alfa Aesar®), of phosphoric acid at 85% by weight (0.53 g, 99.99%, Sigma-Aldrich®) in 14.7 ml of demineralized water. After dry impregnation of 20 g of support E', the impregnated alumina is left to mature in a water-saturated atmosphere at ambient temperature for 4 hours, and then dried at 120° C. for 4 hours. The catalyst thus obtained is denoted E.

The final metal composition of the catalyst E, expressed in the form of oxides and relative to the weight of dry catalyst, is then the following: $MoO_3$=10.5+/−0.2% by weight, CoO=2.0+/−0.1% by weight and $P_2O_5$=1.4+/−0.1% by weight. The Co/Mo and P/Mo molar ratios are respectively 0.37 and 0.27. The pore volume of the catalyst B is 0.52 ml/g and the specific surface area is 136 m²/g.

The distributions of the elements and thicknesses of the crust in the active phase of the catalyst E, measured using a Castaing microprobe, are given in Table 1.

Example 6: Preparation of Catalyst F (not in Accordance with the Invention, High $S_{BET}$+NO Phosphorus)

A support F' is provided, which support is mainly composed of gamma-alumina in the form of beads with a particle size of between 2 and 4 mm, and having a specific surface area of 264 m²/g and a pore volume of 0.46 ml/g.

A catalyst is prepared according to the protocol provided in the experimental section of the article Journal of Natural Gas Chemistry 21(2012)194-199 on 28 g of the support F' in order to adjust the amounts of impregnation solution to the pore volume of the support F' used, the impregnation time being set at 15 minutes.

The catalyst F is obtained. The final element composition of the catalyst F, expressed in the form of oxides and relative to the weight of dry catalyst, is then the following: $MoO_3$=6.8+/−0.2% by weight and CoO=1.8+/−0.1% by weight. The Co/Mo molar ratio is 0.57. The specific surface area of the catalyst F is 242 m²/g and the pore volume area is 0.44 ml/g.

The distributions of the elements and thicknesses of the crust in the active phase of the catalyst F, measured using a Castaing microprobe, are given in Table 1.

Example 7: Evaluation of the Performance Levels of Catalysts A to F Used in Hydrodesulfurization In this example, the performance levels of the catalysts A to F are evaluated in hydrodesulfurization of a catalytic cracking gasoline.

A model feedstock representative of a catalytic cracking (FCC) gasoline containing 10% by weight of 2,3-dimethylbut-2-ene and 0.33% by weight of 3-methylthiophene (i.e. 1000 ppm by weight of sulfur in the feedstock) is used for the evaluation of the catalytic performance qualities of the various catalysts. The solvent used is heptane.

The hydrodesulfurization reaction (HDS) is carried out in a fixed traversed bed reactor under a total pressure of 1.5 MPa, at 210° C., at HSV=6 h$^{-1}$ (HSV=flow rate by volume of feedstock/volume of catalyst) and an $H_2$/feedstock ratio by volume of 300 Sl/l, in the presence of 4 ml of catalyst. Prior to the HDS reaction, the catalyst is sulfided in situ at 350° C. for 2 hours under a flow of hydrogen containing 15 mol % of $H_2S$ at atmospheric pressure.

Each of the catalysts is placed successively in said reactor. Samples are taken at different time intervals and are analyzed by gas chromatography so as to observe the disappearance of the reactants and the formation of the products.

The catalytic performance qualities of the catalysts are evaluated in terms of catalytic activity and of the selectivity. The hydrodesulfurization (HDS) activity is expressed from the rate constant for the HDS reaction of 3-methylthiophene (kHDS), standardized by the volume of catalyst introduced, and assuming first order kinetics with respect to the sulfur compound. The activity for hydrogenation of the olefins (HydO) is expressed from the rate constant for the hydrogenation reaction of 2,3-dimethylbut-2-ene, standardized by the volume of catalyst introduced, and assuming first order kinetics with respect to the olefin.

The selectivity of the catalyst is expressed by the standardized ratio of the rate constants kHDS/kHydO. The kHDS/kHydO ratio will increase as the catalyst becomes more selective. The values obtained are standardized by taking the catalyst A as reference (relative HDS activity and relative selectivity equal to 100). The performance levels are thus the relative HDS activity and the relative selectivity.

TABLE 1

| Catalyst | A In accordance with the invention | B In accordance with the invention | C Not in accordance with the invention | D Not in accordance with the invention | E Not in accordance with the invention | F Not in accordance with the invention |
|---|---|---|---|---|---|---|
| Sbet support | 194 | 145 | 81 | 194 | 145 | 264 |
| CoO content (wt %) | 1.1 | 1.1 | 0.6 | 1.1 | 2.0 | 1.8 |
| $MoO_3$ content (wt %) | 5.3 | 5.2 | 3.0 | 5.3 | 10.5 | 6.8 |
| $P_2O_5$ content (wt %) | 0.7 | 0.7 | 0.4 | — | 1.4 | — |
| Co/Mo molar ratio | 0.39 | 0.38 | 0.38 | 0.39 | 0.37 | 0.57 |
| P/Mo molar ratio | 0.27 | 0.26 | 0.27 | — | 0.27 | — |
| $R_{Co}$ | 0.53 | 0.65 | 1.09 | 0.87 | 0.88 | 0.62 |
| $R_{Mo}$ | 0.53 | 0.66 | 1.07 | 0.97 | 0.87 | 0.61 |
| $R_P$ | 0.42 | 0.45 | 0.53 | — | 0.76 | — |
| Crust thickness (μm) | 720 | 950 | not determinable | not determinable | not determinable | 860 |
| Relative activity | 100 | 110 | 53 | 85 | 101 | 90 |
| Relative selectivity | 100 | 95 | 88 | 89 | 93 | 102 |

Distribution of elements, measurements of crust thickness and hydrodesulfurization performance levels of catalysts A to F It is noted that the catalysts A and B according to the invention exhibit better performance levels in terms of activity and selectivity, while at the same time enabling a better efficiency of the active phase and thus using small amounts of group VIB and VIII elements.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A catalyst comprising an active phase containing at least one group VIB element, at least one group VIII element and phosphorus, and a porous support containing at least alumina, said catalyst comprising at least 80% by weight of the at least one group VIB element, of the at least one group VIII element and of the phosphorus, which are distributed in the form of a crust at the periphery of said support, the thickness of said crust being between 100 and 1200 μm, the content of group VIB element, measured in oxide form, being 3 to 6% by weight relative to the total weight of the catalyst, the content of group VIII element, measured in oxide form, being 0.5 to 3% by weight relative to the total weight of the catalyst, and the content of phosphorus, measured in its oxide form $P_2O_5$, being between 0.2% to 3% by weight relative to the total weight of the catalyst, said support comprising a specific surface area of 130 m²/g to 198 m²/g, and a molar ratio between the group VIII element and the group VIB element being between 0.35 and 0.45 mol/mol.

2. The catalyst according to claim 1, having a molar ratio of the phosphorus to the group VIB metal of 0.1 to 2.0 mol/mol.

3. The catalyst according to claim 1, wherein the thickness of said crust is 200 to 1000 μm.

4. The catalyst according to claim 1, wherein the content of phosphorus, measured in its oxide form $P_2O_5$, is 0.2% to 2% by weight, relative to the total weight of the catalyst.

5. The catalyst according to claim 1, wherein said support is based on gamma-alumina and/or chi-alumina, taken alone or as a mixture.

6. The catalyst according to claim 1, wherein said support is in the form of beads.

7. The catalyst according to claim 1, having a molar ratio of the phosphorus to the group VI metal of 0.2 to 0.4 mol/mol.

8. The catalyst according to claim 1, wherein said support has a total pore volume, measured by mercury porosimetry, of 0.3 cm³/g to 0.9 cm³/g.

9. A process for the hydrodesulfurization of a sulfur-containing olefinic gasoline cut, in which said gasoline cut, hydrogen and the catalyst according to claim 1 are brought into contact, said hydrodesulfurization process being carried out at a temperature of 200° C. to 400° C., a total pressure of 1 MPa to 3 MPa, an hourly space velocity, defined as being the flow rate by volume of feedstock relative to the volume of catalyst, of 1 h⁻¹ to 10 h⁻¹ and a hydrogen/gasoline cut ratio by volume of 100 to 600 Sl/l.

* * * * *